W. Rouse.
Spinning Mule.
No. 233.
Reissued Mar. 15, 1853.
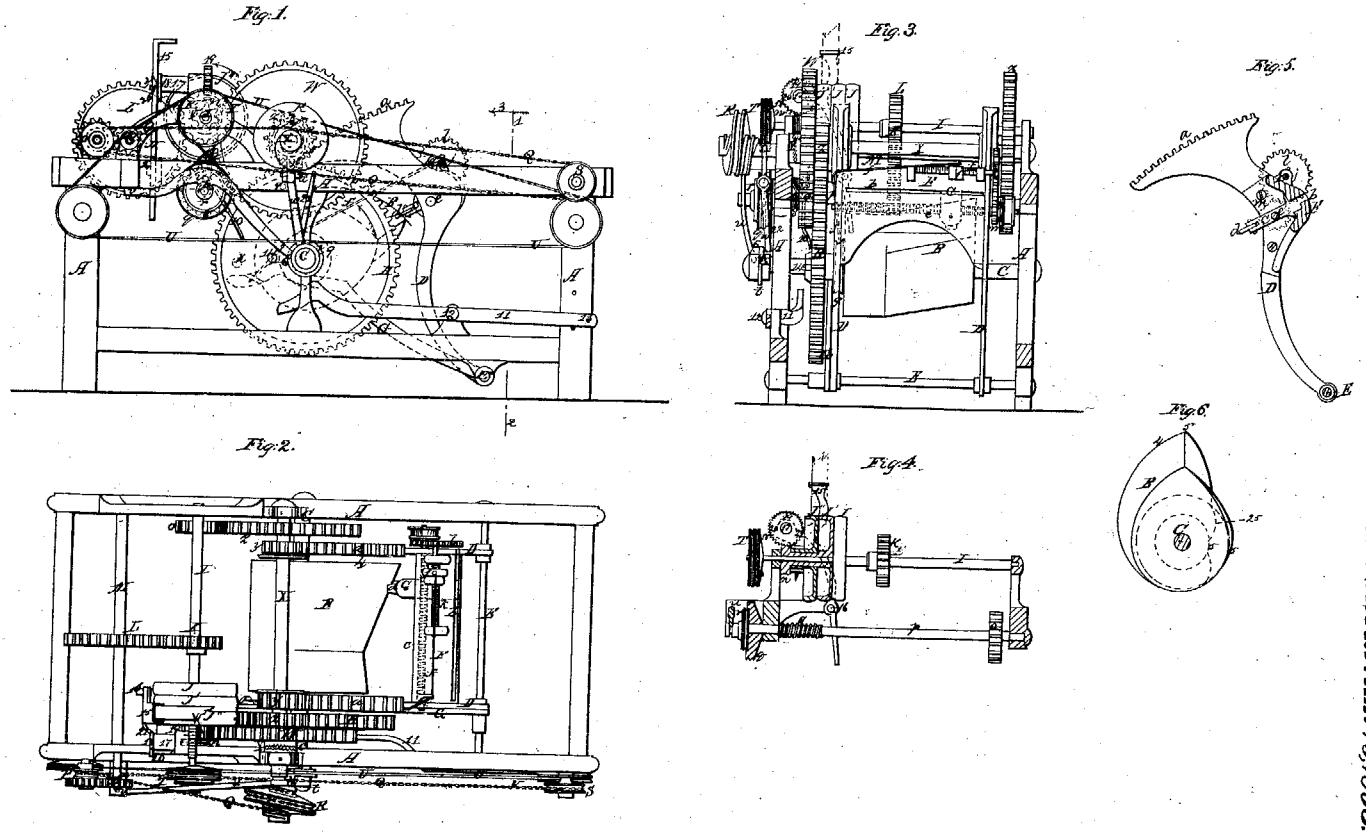
N. PETERS, PHOTO-LITHOGRAPHER, WASHINGTON, D. C.

UNITED STATES PATENT OFFICE.

WANTON ROUSE, OF TAUNTON, MASSACHUSETTS.

IMPROVEMENT IN SELF-ACTING MULES FOR SPINNING.

Specification forming part of Letters Patent No. 9,378, dated November 2, 1852; Reissue No. 233, dated March 15, 1853.

*To all whom it may concern:*

Be it known that I, WANTON ROUSE, of Taunton, in the county of Bristol and State of Massachusetts, have invented certain new and useful Improvements in the Self-Acting Mule for Spinning Cotton and other Fibrous Materials; and I do hereby declare that the following is a full, clear, and exact description of the same, reference being had to the accompanying drawings, forming part of this specification, in which—

Figure 1 is an elevation of the side of the mule which is next the carriage. Fig. 2 is a plan. Fig. 3 is a transverse vertical section in the line 1 2 of Fig. 1, looking in the direction of the arrow 3. Fig. 4 is a vertical section of the driving-gear, looking in the same direction as in Fig. 3. Fig. 5 is a vertical section of what I term the "toothed segment-frame," looking in the same direction as in Fig. 1. Fig. 6 is a profile of the cam which governs the building of the cops.

Similar letters of reference indicate corresponding parts in each of the several figures.

This invention, which is designed to simplify the construction of the mule, relates chiefly to the employment, for the purpose of governing the revolution of the spindles in winding the thread on the cops, and in backing off preparatory to the said winding on, of a cam having a periphery of irregular form, longitudinally and circumferentially. The said cam is caused to give revolution to the spindles by means of a finger, which always bears on its periphery and which is attached to a swinging frame, furnished with toothed segments which gear with toothed wheels upon a shaft, which, through a train of gearing, drives the spindles. The cam is caused to revolve at the time that the backing off should be performed, and also during the time the mule is running up to the beam, when the winding of the thread upon the spindles is to be performed. Its periphery is of such form circumferentially that the finger will be running toward the axis at the proper time for backing off, and from the axis at the proper time for winding. This, by causing the segments to move in opposite directions, causes the spindles to be driven in opposite directions. The cam is of such form, on the part where the finger bears during the running up of the carriage, as to drive the spindles with a constantly-accelerated motion, which is necessary, owing to the decreasing diameter of the cop towards the top, where the winding finishes. Its circumferential form varies at different parts of its length, which gives it the longitudinal irregularity of form before spoken of. This is to suit the degree of acceleration of speed and the amount of backing off required at different stages of the building of the cop, whose form is constantly changing from the commencement to the termination of the winding, the finger having a slow movement from end to end of the cam for the purpose, by the varying form of the cam, of giving a varying movement to the segments, and consequently to the spindles.

The other parts of the invention are subsidiary to the cam or irregularly-shaped barrel, either for communicating motion to it or for transmitting motion to the various parts.

To enable those skilled in the art to put my invention into practical operation, I will now enter into a full and detailed description of it.

The carriage, being the same as in other mules, is not shown in the drawings, and will need no description here, the improvements being all confined to the head, of which A is the framing, which carries all the working parts.

B is the cam or irregularly-shaped barrel which governs the backing off and winding on of the yarn. It is secured on a shaft, C, which works in suitable bearings in about the middle of the framing. Its greatest eccentricity, circumferentially, is at the end 5*, and it approaches nearer to a circular form toward the opposite end. (See more particularly Fig. 6.)

D D are two levers which are secured firmly to a shaft, E, hung in suitable bearings in the lower part of the framing and forming their fulcrum. Between the two levers D D is secured a box, F, which, together with the levers, forms a swinging frame. The upper ends of the levers carry toothed segments *a a*, which form parts of circles described from E. In a suitable guide, consisting of a slot, *b*, running nearly from end to end of the box F, parallel to the shafts E and C, is fitted a stock, *c*, in which is secured the finger *d*, which always bears upon the periphery of the cam B. A screw, *e*, runs the whole length of the box, having journals at its ends, fitting in the ends of the box, and being prevented from moving endwise. This screw passes through a female screw in the stock *c*, and consequently, when it is turned, it gives the stock a movement longitudinally in the slot *b* and moves the finger *d* along the cam. The screw is turned after every revolution of the cam by a ratchet, or other contrivance, to give the finger the required movement on the cam. In order to keep the finger *d* always touching the cam during its entire revolution and insure the descent of the swinging frame, it is necessary to draw it towards the cam, or else the resistance offered by the parts driven by the segments would stop it during the time the descending portion, or the portion from 5* to 5 of the periphery, which recedes towards the axis, is passing it. For the above purpose, the swinging segment frame is connected by a cord or chain, *f*, which passes over a pulley, *g*, on the shaft C close to the cam, to the end of a lever, G, which hangs loosely on the shaft E, the said shaft forming its fulcrum. This lever is operated upon by a stud, *h*, secured in the inner face of a toothed wheel, H, which is secured on the shaft C of the cam, and by which the said shaft is driven, the said stud, as the cam revolves, pressing on the upper edge of the said lever, and causing it, by drawing on the cord or chain *f*, to make the segment-frame and its finger *d* follow the receding part of the cam, the upper edge of the lever being of proper form to correspond with the cam. It will be seen that as the heel 5 of the cam B, or the point of the periphery which is nearest the axis, gradually rises from the end 4 to the opposite end, that the cord or chain *f* wants lengthening to prevent its being strained or broken. In order to accomplish this it is not rigidly attached to the frame itself, but to a block or nut, *j*, which has a female screw in it fitting to a male screw, *k*, which has journals at each end, fitting in suitable bearings on the top of the box F. The screw *k* is parallel with the screw *e*, and like it is prevented moving endwise. It is furnished with a toothed wheel, *l*, which gears into a toothed wheel, *m*, on *e*, and every movement of the screw *e* communicates a movement in the opposite direction to that, *k*. The nut *j*, being prevented turning by bearing on the top of the box F, is caused to move along the screw and thus give out the cord or chain. Care is taken that the size of the wheel *l* should bear a proper proportion to that, *m*, to let out the cord or chain just sufficient to compensate for the rise in the heel of the cam, and no more, or it would fail to draw the segment-frame down far enough.

I is the main driving-shaft of the machine, carrying three driving-pulleys, J J′ J″, all of equal diameter. A band from any prime mover communicates motion to either of the said pulleys, being shipped from one to the other at different stages of the operation of the mule. The pulley J is fast upon the shaft and serves to run the carriage out from the beam and to drive the drawing-rolls and whirl the spindles to spin and stretch the yarn. The pulley J′ is loose upon the shaft and receives the band just before the termination of the stretch. Both the above pulleys are the same as in other self-acting mules. The pulley J″ is loose on the hub of the pulley J′, which extends through it for the purpose of carrying an endless screw, *n*, which forms part of the belt-shipping apparatus spoken of in the commencement of this specification. The last-named pulley J″ drives the cam B, which backs off the spindles and whirls them during the winding of the yarn on the cops, and also drives the carriage up to the beam. The main shaft I carries a toothed wheel, K, which gears into and gives motion to a larger toothed wheel, L, on a shaft, M, which carries a pinion, N, gearing into and giving motion to the toothed wheel O, which drives the front drawing-rolls. Attached to the wheel O is a small pulley, P, around which runs the endless chain Q, which drives the mule-carriage, the said chain passing round the scroll R and round a pulley, S, hung at the front end of the framing, the carriage being connected to its under part. The said shaft I also carries a pulley, T, around which runs the endless band or chain U, which drives the spindles in the usual manner. This last-described train of mechanism is all in operation when the driving-band is on the pulley J. The pulley J″ has a toothed pinion, V, attached to it, which gears into and drives a toothed wheel, W, which runs loosely on a shaft, X, which is hung in suitable bearings on the upper part of the frame. Attached to the inner side of the wheel W is a smaller toothed wheel, Z, which gears into the toothed wheel H on the cam-shaft and gives revolution to the cam B. On the opposite side of the wheel W—that is to say, on its outer side—is secured part of a clutch, Y, which drives the scroll R, the other part of the clutch being attached to the scroll itself. The scroll works loosely on the shaft X, and, when the clutch is in gear to drive it, runs the carriage towards the beam. Fast upon the shaft X are a pair of small toothed wheels, *y y*, which gear into and receive motion from the toothed segments *a a*, and, upon the same shaft, also fast, is a large toothed wheel, Z, which gears into and drives a small toothed wheel, *o*, which is fast upon a shaft, *p*, which hangs in suitable bearings below the main shaft I. The shaft *p* carries a pulley, *q*, which drives the spindles in backing off and winding the yarn on the cops. It is loose on the shaft, and stands close up to the side of the frame or to a shoulder on the shaft itself. The band U passes round this pulley *q* in the opposite direction to that in which it passes round the pulley T, which drives the band from the main shaft, (see Fig. 1,) so that the two pulleys always revolve in opposite directions. The pulley has a conical recess turned in its outer face, (see Fig. 4,) which forms part of a friction-clutch, the other part, *r*, of the clutch being fast on the end of the shaft. This clutch is kept in gear by a helical spring, *s*, which is coiled around the shaft *p*, and is compressed between the inside of the framing and a shoulder or stud on the shaft for a suitable length of time to back off and wind on; and is thrown out of gear just before the cam B stops, after having run up the carriage, by a cam, *t*, on the end of the shaft C, which said cam has an incline, 6, on its outer face, resembling part of a screw, which acts upon and forces out the end of a lever, *u*, the said lever being attached, at its opposite, end, to a stationary fulcrum, *v*, secured to the framing, and being connected near the middle of its length to the end of the shaft *p*. The effect produced by the cam is to draw out the shaft endwise, and thus free the clutch. The cam *t* has an incline, 7, (see Fig. 3,) on its inner face, which also forms a portion of a screw. This incline is for the purpose of throwing the scroll clutch Y out of gear just before the mule-carriage reaches the beam, which it does by means of a lever, *w*, which works on a fulcrum, *x*, secured to the frame, the said lever having a fork which embraces the part of the clutch connected to the scroll, and which, when the incline 7 throws the lower end of the lever upon which it impinges inward, draws the scroll outward free of the wheels W and Z, the scroll being kept in gear, when not operated on by the incline on the cam, by a spring, 22, which forces out the lower end of the lever. In communication with the pulley J″ there is a brake, 8, (see Fig. 1,) which is made to bear on it inside the rim by a stud, *g*, on the inner face of the wheel H, which acts upon the lever 10, to which the brake is attached. This brake is for the purpose of stopping it, so as to leave the cam B in the proper position.

11 is the lever which operates the faller. It hangs nearly horizontal on a fulcrum, 12, in the lower part of the framing. The front end connects by a pin, 13, with the end of the coping-rail, which is connected with and operates the faller in the same manner as in any other self-acting mule. The back end is operated on at suitable times to raise the coping-rail and put down the faller by a stud, 14, on the outer face of the wheel H, the part of the upper edge of the lever on which the stud acts being of suitable form to give the required motion.

The mechanism for shipping the belt from the loose pulley J′ to the pulley J″ consists of a shipping-lever, 15, and a spindle, 17, which works in suitable bearings secured to the top of the framing, and carries a cam, 18, and a worm-wheel, 19, the worm-wheel gearing with the endless screw *n* on the end of the hub of the loose pulley. The shipping-lever 15 hangs on a stationary fulcrum, 16, and is balanced or otherwise governed by a spring or its equivalent, which always gives it a tendency to drive the belt toward J″, but it always rests upon the periphery of the cam 18. This cam, when the belt comes on the loose pulley J′, commences revolving by reason of the worm-wheel 19 on its spindle or axis receiving motion from the endless screw *n*, and is, when the belt first comes on the loose pulley, in a position to keep it there; but as it revolves its step, 20, is caused to pass the projection 21 on the shipper-lever, which bears against it, and the lever is allowed, by the means before described (but not shown, as there are many ways of obtaining the same result) to shift the belt to J″, where it remains until the continued revolution of the cam returns it to the loose pulley J′. The mechanism for shipping the belt from J to J′ as the stretch is finished is the same as in other mules, and therefore does not require description.

The several parts of the mule being now explained, I will proceed to describe their several operations, as they take place, supposing, at the commencement, that the cop is just commenced, and that the mule-carriage is up close to the beam, ready to run out. The cam B and all the train of gearing connected with it will be stationary, the finger being on the line 25, which is shown in Fig. 4, and supposed to run from end to end of the cam, and near the end 4. The driving belt will be on the fast pulley J. The friction-clutch *r* will be uncoupled so as to leave the band U free of the pulley *q*, the end of the lever *u* being on the highest point of the incline 6 of the cam *t*. I will now suppose the motion to commence, the pulleys always running in the direction of the arrow shown near their circumference in Fig. 1. The main shaft I, communicating motion to the shaft M, gives motion to the toothed wheel O and pulley P the pulley driving the chain *q* and running out the mule, and the wheel O driving the rolls to draw and supply the yarn to the spindles, the pulley T at the same time driving the band or chain U in the proper direction to whirl the spindles. Before the carriage finishes running out, the belt is shipped by the ordinary means from the pulley J to the loose pulley J′, and the endless screw attached to this pulley soon drives the worm-wheel 19 and cam 18 so far round as to make the step 20 on the said cam pass the shipper-lever and allow it to ship the belt to the pulley J″, which, by means of the pinion V and wheels W, Z, and H, sets the cam B in motion in the direction of the arrow shown upon the wheel H in Fig. 1. The end of the lever *u* immediately passes over the point of the incline 6, and the friction-clutch *r* strikes into gear. The finger *d* descends toward the heel or less prominent part 5 of the cam, and causes the segments *a a* and wheels *y y* to drive the shaft X, and the wheel Z gives motion through the wheel O to the shaft *p*, and the friction-clutch which couples the pulley *q*, being in gear, changes the direction of the motion of the band or chain U and reverses the movement of the spindles for backing off the yarn. Prior to the commencement of the backing off, the stud 14 on the wheel H operates upon the lever 11 and puts down the faller. When the heel 5 of the cam B passes the finger *d*, the rising part of the cam raises it, and, by reversing the motion of the segments *a a*, again reverses the motion of the spindles for winding the yarn on the cops, and at the instant this commences, the small cam *t*—its incline 7, having passed the lever *w*—allows the scroll R to strike into gear; this runs the carriage up toward the beam, commencing slowly, then gradually accelerating the speed, and as it arrives near to the beam gradually retarding it. As the carriage reaches the beam, the scroll is thrown out of gear by the operation of the incline 7 of the cam *t* on the lever *v*, and the clutch *r* is uncoupled by the operation of the incline 6 on the lever *u*. The motions of the carriage and of the spindles are thus both stopped at the same time. The loose pulley J′ keeps revolving with the pulley J″ and after the carriage is run up, it will have caused the endless screw *n* and worm-wheel 19 to move the cam 18 far enough round to cause the shipper-lever to ship the belt onto its own periphery, where it remains until it is shipped by the usual means to the pulley J, for running the carriage out again. After the scroll and the friction-clutch *r* which drives the spindles are thrown out of gear, the finger *d* passes down the commencement of the incline on the cam B till it reaches the line 25, where it rests during the running out, ready for the next backing off. The belt, being shipped from the pulley J″ just before this, allows the said pulley and the mechanism by which it drives the cam to be stopped by the stud *g* coming into operation on the brake 8.

The above-described series of operations are repeated until the cops are finished, the screw *e* moving the finger *d* after every winding on of the yarn on the cop until, by the time the cop is finished, the finger has reached the opposite end of the cam B. I have shown no mechanism for operating the screw *e*, as I do not confine myself to any mode of communicating motion to it, there being several ways in which it might be done equally well.

Before proceeding to explain particularly what I claim as my invention, I will point out the difference between the cam which forms one of the elements of my invention and a cam or irregularly-shaped piece of wood employed in a self-acting mule described in Newton's "London Journal," appearing from the description to bear some resemblance to it. The effects produced by them are very different. The latter cam governs the operation of the faller-wire, which guides the laying on of the yarn on the spindles during their revolution, and thus its form regulates the shape of the cop, but it in no way controls the revolution of the spindles. My cam does not operate on the faller or regulate the shape of the cop, as that is done in my mule in the ordinary way, which need not be explained; but it causes the spindles to receive rotary motion at such a varying speed as the varying circumference of the cop, from the bottom to top of each layer, and the varying difference of circumference between the bottom and top in the several successive layers require.

What I claim as my invention, and desire to secure by Letters Patent, is—

1. Governing the revolution of the spindles in winding the yarn on the cop, and also in backing off, during the progressive stages of the building by means of a cam, B, or any equivalent device of irregular form, circumferentially, with the said irregularity varying from end to end, the said cam or equivalent being caused to operate upon the mechanism which drives the spindles in any way that will produce the results herein set forth.

2. The mechanism for causing the finger *d*, through which the irregular surface of the cam B or its equivalent acts upon the mechanism which drives the spindles in backing off and building on, to traverse the said cam and to be kept close to its surface, consisting of the screws *e* and *k*, the nut *j*, cord or chain *f*, lever G, and stud *h*, operating in combination in the manner substantially as set forth.

WANTON ROUSE.

Witnesses:
GEORGE W. HILL,
BENJ. R. DEANE.